US009995464B2

(12) United States Patent
Hierzer

(10) Patent No.: US 9,995,464 B2
(45) Date of Patent: Jun. 12, 2018

(54) INTERIOR LIGHT AND METHOD OF MANUFACTURE

(71) Applicant: H4X e.U., Graz (AT)

(72) Inventor: Andreas Hierzer, Graz (AT)

(73) Assignee: H4X e.U., Graz (AT)

( * ) Notice: Subject to any disclaimer, the term of this patent is extended or adjusted under 35 U.S.C. 154(b) by 0 days. days.

(21) Appl. No.: 15/229,642

(22) Filed: Aug. 5, 2016

(65) Prior Publication Data

US 2017/0038034 A1 Feb. 9, 2017

(30) Foreign Application Priority Data

Aug. 5, 2015 (DE) ........................ 10 2015 214 949

(51) Int. Cl.

| | |
|---|---|
| ***H05B 39/00*** | (2006.01) |
| ***H01M 2/10*** | (2006.01) |
| ***F21V 14/06*** | (2006.01) |
| ***F21V 19/00*** | (2006.01) |
| ***F21V 29/503*** | (2015.01) |
| ***F21V 17/18*** | (2006.01) |
| ***F21S 8/04*** | (2006.01) |
| ***F21V 21/30*** | (2006.01) |

(Continued)

(52) U.S. Cl.

CPC ................ *F21V 14/06* (2013.01); *F21S 8/04* (2013.01); *F21V 17/18* (2013.01); *F21V 19/0055* (2013.01); *F21V 21/30* (2013.01); *F21V 29/503* (2015.01); *F21W 2131/405* (2013.01); *F21Y 2115/10* (2016.08)

(58) Field of Classification Search

CPC .......... F21V 14/06; F21V 21/30; F21V 17/18; F21V 29/503; F21V 19/0055; F21S 8/04; F21Y 2115/10; F21W 2131/405

See application file for complete search history.

(56) References Cited

U.S. PATENT DOCUMENTS 5,083,253 A 1/1992 Hahnel et al.
2006/0274541 A1 12/2006 Sheen (Continued)

FOREIGN PATENT DOCUMENTS

DE 20 2006 014 503 U1 12/2006

OTHER PUBLICATIONS

English Abstract of DE202006014503, Publication Date: Dec. 14, 2006.

(Continued)

*Primary Examiner* — Tracie Y Green

(74) *Attorney, Agent, or Firm* — Millen, White, Zelano & Branigan, P.C.; William Nixon

(57) ABSTRACT

An interior light, in particular for shelf or display case illumination, includes an adjustment unit, which has a lens; a main body, which has a cylindrical recess inside which a lighting means is arranged; at least one guide which is provided on the recess and extends parallel to a cylinder axis of the recess; and latch means which are arranged in the region of the recess and have a plurality of latching stages, the adjustment unit having mating latch means which can latch to the latch means and guide means for guiding the adjustment unit in the guide; the guide means being arranged in each case at different positions within the guide when the mating latch means latch to the different latching stages, and a different distance being set between the lighting means and the lens in each case.

18 Claims, 6 Drawing Sheets

(51) Int. Cl.

| | |
|---|---|
| *F21W 131/405* | (2006.01) |
| *F21Y 115/10* | (2016.01) |

(56) References Cited

U.S. PATENT DOCUMENTS

| | | | |
|---|---|---|---|
| 2007/0035944 | A1 | 2/2007 | Dalton et al. |
| 2010/0231142 | A1 | 9/2010 | Yoon |

OTHER PUBLICATIONS

Office Action issued in related German Patent Application No. 102015214949.8 dated Apr. 6, 2016.

INTERIOR LIGHT AND METHOD OF MANUFACTURE

FIELD OF THE INVENTION

The present invention relates to an electrical interior light, in particular for shelf or display case illumination, and to a method for manufacturing an interior light of this type.

TECHNICAL BACKGROUND

Interior lights or interior lighting devices are provided for internal spaces, there being a wide variety of subtypes. It is common to interior lights that they are generally rigidly mounted, for example on a wall, in a shelf, in a display case on a pedestal or the like. They are designed to be connected to a conventional domestic mains supply.

In interior lights, increased requirements are regularly placed on the design or the external appearance.

Shop downlights or ceiling downlights are one subtype of interior lights. They may be provided for mounting in busbars which are attached to a ceiling and which simultaneously mechanically hold the downlights and make power supply possible. A further subtype of interior lights are specifically provided for shelf or display case lighting. Interior lights of this type are generally of a very compact or small construction.

In shelf or display case illumination, a particular requirement is that of showcasing a product item or a portion of a product shelf using light specifically directed onto it, for the purpose of presenting of a product. In particular, it should be possible to shine light onto individual regions selectively, the surface to be illuminated having a predetermined size or outline. It is thus expedient to limit the beam angle of the light. On the other hand, however, interior lights of this type for shelf or display case lighting should also be usable for different goods or on different presentation stands. It is therefore particularly advantageous to provide a corresponding interior light with a variably adjustable beam angle. Thus, it is also possible in particular to make a subsequent change to the desired light situation or to reuse an interior light for a newly constructed presentation situation in spite of different requirements on the beam angle.

EP 2 221 524 A3 discloses an LED light in which the distance between the LED and a lens is adjustable. For this purpose, the LED light has a rotational adjustment arrangement, which consists of a guide groove, extending in a helical line shape about the longitudinal axis of a two-part housing, on a first housing part and a peg, guided in the guide groove, on a second housing part. By rotating the two housing parts with respect to one another, the distance between the lens and the LED in the axial direction can be adjusted. In an LED light of this type, the desired beam angle has to be set by trial and error. Furthermore, the second housing part is arranged externally around the first housing part, and has, by comparison with the first housing part, a rather large diameter which in particular opens out in a funnel shape and so the light as a whole has a comparatively large diameter.

SUMMARY OF THE INVENTION

In the following, the present invention is described using the example of an interior light for shelf or display case lighting. However, the present invention is not limited thereto, but is transferable to a wide range of interior lights.

Accordingly, the following are provided:

- an interior light, in particular a shop downlight and/or ceiling downlight, comprising: an adjustment unit, which has a lens; a main body, which has a cylindrical recess inside which a lighting means is arranged; at least one guide which is provided on the recess and extends parallel to a cylinder axis of the recess; and latch means which are arranged in the region of the recess and have a plurality of latching stages, the adjustment unit having mating latch means which can latch to the latch means and guide means for guiding the adjustment unit in the guide; the guide means being arranged in each case at different positions within the guide when the mating latch means latch to the different latching stages, and a different distance being set between the lighting means and the lens in each case.
- a method for manufacturing an interior light, in particular an interior light according to the invention, comprising the following method steps: providing a main body, which has a cylindrical recess and a lighting means arranged inside the recess, at least one guide which extends parallel to a cylinder axis of the recess being provided on the recess, latch means which have a plurality of latching stages being provided in the region of the recess; providing an adjustment unit, the adjustment unit having a lens and mating latch means which can latch to the latch means, as well as guide means for guiding the adjustment unit in the guide; and inserting the adjustment unit into the recess, the guide means being arranged in each case at different positions within the guide when the mating latch means latch to the different latching stages, and a different distance being set between the lighting means and the lens in each case.

One of the concepts behind the present invention involves both designing an adjustment unit to be retractable in a main body of a light and achieving different beam angles by directly displacing the adjustment unit within the main body along the primary axis of the light, which corresponds to the cylinder axis of the recess.

Advantageously, in spite of the beam angle being adjustable, an interior light according to the invention can be achieved using comparatively small downlight diameters or using a very small construction space. The particularly small construction according to the invention makes possible particularly advantageous use of the interior light for shelf or display case illumination. For example, small construction sizes having diameters in the range of from 22 mm to 32 mm are possible.

Nevertheless, larger interior lights can, of course, also be achieved according to the invention. However, unlike in previous lights, larger diameters are no longer required for manual adjustability, since according to the invention no torsional force has to be exerted on the lamp housing for the adjustment. Instead, particularly simple operation, simply by directly displacing the adjustment unit (without torsion) along the lamp axis in different latching stages, is provided.

Simultaneously, a particularly slim design of the interior light according to the invention is possible, since the entire adjustment mechanism for setting different beam angles requires merely a very small construction space by comparison.

Furthermore, dispensing with rotational mechanisms, which were conventional until now, makes new methods of product design possible. In this case, it is possible to dispense with flutings, rubber rings or the like on the periphery of the light, used for rotating the lamp parts with respect to one another, which are otherwise often present. As a result, the complexity and costs of manufacture can be reduced, and in addition the product design or the outward appearance of the product can be improved.

In particular a convex lens may be provided as the lens.

A plurality of for example three latching stages may be provided. Alternatively, a different plurality of two, four, five or more latching stages may be provided.

An LED (light-emitting diode) or a semiconductor lighting means may be provided as the lighting means. However, other types of lighting means such as halogen lighting means or OLEDs (organic light-emitting diodes) are used in some embodiments.

A cylindrical recess means any type of cylindrical shape. This may be a circular cylindrical shape having a circular base. However, cylindrical shapes having a different base are used in some embodiments, for example a quadrilateral, hexagonal or octagonal base. The cylinder axis may extend perpendicularly to the base of the cylindrical shape. However, an extension of the cylinder axis oblique to the base face may be used in some embodiments.

The adjustment unit is used to adjust the beam angle of the light emitted by the interior light. It is accordingly made transparent, for example in the form of a hollow cylinder, the lens being arranged in the light path. The cylinder axes of the recess and the hollow cylindrical adjustment unit would thus be coincident or parallel.

The latching stages may be provided at regular intervals. However, irregular intervals are used in some embodiments.

The latch means may be provided inside or outside the guides. Furthermore, the latch means may also be provided at a location remote from the guides, in the region of the recess.

Advantageous embodiments and developments may be derived from the claims and from the description with reference to the figures of the drawings.

In some embodiments, the at least one guide is formed as an elongate opening in the main body. For example, the guide may be provided in the form of a slot in the side wall of the main body and extend outwards from the recess through the side wall. Advantageously, the guide means can thus be reached or actuated from the outside through the guide.

In some embodiments, the latch means are arranged directly on the guide. For example, the latch means are formed as grooves laterally connecting to the opening in an inner wall of the recess. Preferably, if the cylindrical shape is a circular cylindrical shape, the grooves extend at least in portions in the peripheral direction of the recess, in other words perpendicular to the extension direction of the grooves. Advantageously, the latch connection is thus between the guide means guided in the guides and the latch means is directly at the grooves. This has the advantage that, on the one hand, the degree of freedom provided by the guides is restricted directly at the grooves in the latched state, and on the other hand, as a result of the direct contact with the guide means, haptic feedback is provided during latching at the guide means. In addition to the guide means, centring means, for example resilient centring tabs, for centring the adjustment unit may be provided in the recess.

In some embodiments, at least two guides are provided on the recess. Preferably, the guides are arranged opposite one another. In particular, these are two opposite guides. However, a different even number of guides, which are opposite in each case, would also be conceivable. Optionally or in addition, at least two latch tabs are provided on the adjustment unit, the mating latch means being formed as latch portions provided on the latch tabs. Preferably, the latch tabs are also arranged opposite one another. Analogously to the guides, these are in particular two latching tabs, a different even number of latch tabs, which are opposite in each case, also being conceivable. The latch tabs extend externally on the adjustment unit and protrude slightly outwards. They are for example each provided with a resilient spring arm, in such a way that they are resiliently biased in the assembled state in which the adjustment unit is inserted into the recess. The latch tab shape advantageously ensures reliable latching to the latch means.

In some embodiments, the guide means are formed as guide portions provided on the latch tabs. These guide portions may for example be provided as elongate portions which slide in the guides and have corresponding guide faces. In particular, the width of the guide portions corresponds to the width of the guides in this context, a slight play preferably being provided between the guide portions and the guides. If the guides are formed as an opening, the guide portions may extend through the opening.

In some embodiments, the latch tabs comprise an actuation portion for manually releasing the latch portion from the latch means. In this context, the latch tabs are actuatable by resilient bending by way of manual pressure on the actuation portion, causing the latch tabs to be resiliently bent radially inwards. For this purpose, the actuation portion is located on a portion which can be reached from the outside. In the case of guides in the form of an opening, the actuation portion extends through the guides, in particular together with the guide portion, and is thus actuatable from the outside. Thus, convenient actuation is advantageously provided. Furthermore, the separation of the latch portion and the actuation portion improves the operational safety, since in this way there is for example no risk of a finger being pinched at the latch portions. In particular, the latch tabs are attached via one end of an associated spring arm to the adjustment unit, whilst the actuation portion and the latch portion are located at the free end of the latch tab. The actuation portion projects for example in front of the latch portion, and in the assembled state protrudes through the side wall of the main body or through an opening provided therein. Thus, the actuation portion can be reached and actuated from outside the main body. For this purpose, the latch tabs are externally pressed slightly inwards on both sides, for example by one finger each, and thus released from the latch means.

In some embodiments, the latch portion is formed as at least one rib connecting to the actuation portion. The rib is arranged offset laterally and inwardly towards the cylinder axis with respect to the actuation portion. In particular, the rib is formed in a manner corresponding to the groove. Preferably, this is a groove extending in the peripheral direction of the recess. In this way, a particularly simply designed latch mechanism is provided, which is simple to produce and thus cost-effective to manufacture. Preferably, both the rib and the groove have rounded and/or slanted edges, and such a way that smooth latching or a coordinated latching behaviour is provided.

In some embodiments, the adjustment unit and the latching stages are provided and formed to adjust the beam angle of the interior light within a predetermined range by changing the distance between the lighting means and the lens. For example, the beam angle may be adjustable in the range of from 10° to 50°. For shelf or display case illumination, the beam angle is preferably adjustable in the range of from 10° to 30°, a range of from 15° to 25° being particularly preferable. Advantageously, different beam angles can thus be set, making flexible use of the interior light possible. In particular, the interior light may thus optionally also be used as a particularly small or compact downlight, in addition to shelf or display case illumination.

In some embodiments, the adjustment unit has a reflector and a latch holder which holds both the lens and the reflector. The latch holder is preferably formed as a hollow cylinder for this purpose. During assembly, the lens and the reflector can be inserted and latched into the latch holder together. Advantageously, the adjustment unit can thus be pre-assembled, simplifying the assembly of the interior light in the manufacturing process. Furthermore, the adjustment unit is thus usable as a modular replacement part, for example having lenses of different focal widths for different beam angles. The reflector has a light passage opening, which allows at least the majority of the light emitted from the lighting means to pass through in all positions or in all latching stages of the adjustment unit.

In some embodiments, the reflector or the lens or both have a shoulder or a flange. The latch holder has a spring arm, which is tensioned and latches behind the shoulder and/or flange when the lens and the reflector are inserted in the latch holder. Thus, the adjustment unit can be preassembled in a simple manner, in particular without tools, by inserting and latching the reflector and the lens. For example, the reflector has a peripheral flange and the lens has a peripheral shoulder which can be placed on the flange, and so the flange of the reflector and the shoulder of the lens line up precisely. The latch holder is formed as a hollow cylinder, the internal diameter of the hollow cylindrical shape approximately corresponding, with a slight play, to the external diameter of the shoulder and the flange. The latch arm is provided on the inner wall of the hollow cylindrical shape of the latch holder. Upon insertion into the latch holder, the latch arm initially strikes the shoulder of the lens and is thus biased. For this purpose, a ramp may be provided on the latch arm, for example. When the latch arm passes through fully, it slides over the shoulder and the flange and latches behind the flange of the reflector. On the other side, the latch holder has on its inner wall a peripheral internal rib which braces the shoulder of the lens in this position, and so the lens and the reflector are held positively between the internal rib and the latch arm in the latched state.

In some embodiments, the guide means are formed integrally with the latch holder. In particular, this is an injection-moulded part. This advantageously reduces the number of parts of the interior light, simplifying manufacture and assembly.

In some embodiments, a homogenisation film for homogenising the emitted light is provided integrated into the adjustment unit. The light is thus distributed more uniformly, making more homogeneous illumination possible.

In some embodiments, the homogenisation film is laid between the lens and the reflector. Alternatively, the homogenisation film may also be adhesively attached to the lens. The homogenisation film is thus provided so as to be latchable into the latch holder together with the lens and the reflector during assembly. Thus, particularly advantageously, no additional production step is required for integrating the homogenisation film.

In some embodiments of a method for manufacturing an interior light, the step of providing an adjustment unit includes providing the lens and a reflector and a latch holder. The latch holder may be formed integrally with the guide means. The step of providing the adjustment unit also includes pre-assembly, for which the lens and the reflector are latched into the latch holder together. In addition, before the insertion, a homogenisation film may be laid between the lens and the reflector. Advantageously, pre-assembly of this type can be carried out in a simple manner, without tools.

All features of the interior light are transferable to the method for manufacturing the interior light and vice versa.

The above embodiments and developments can be combined with one another as desired, within reason. Further possible embodiments, developments and implementations of the invention also include combinations not explicitly mentioned of features of the invention disclosed above or in the following in relation to the embodiments. In particular, in this context, a person skilled in the art will also add individual aspects to each basic form of the present invention as improvements or additions.

BRIEF DESCRIPTION OF THE DRAWINGS

In the following, the present invention is explained in greater detail with reference to the embodiments set out in the schematic drawings, in which.

DETAILED DESCRIPTION OF SOME OF THE EMBODIMENTS

Figure 1:
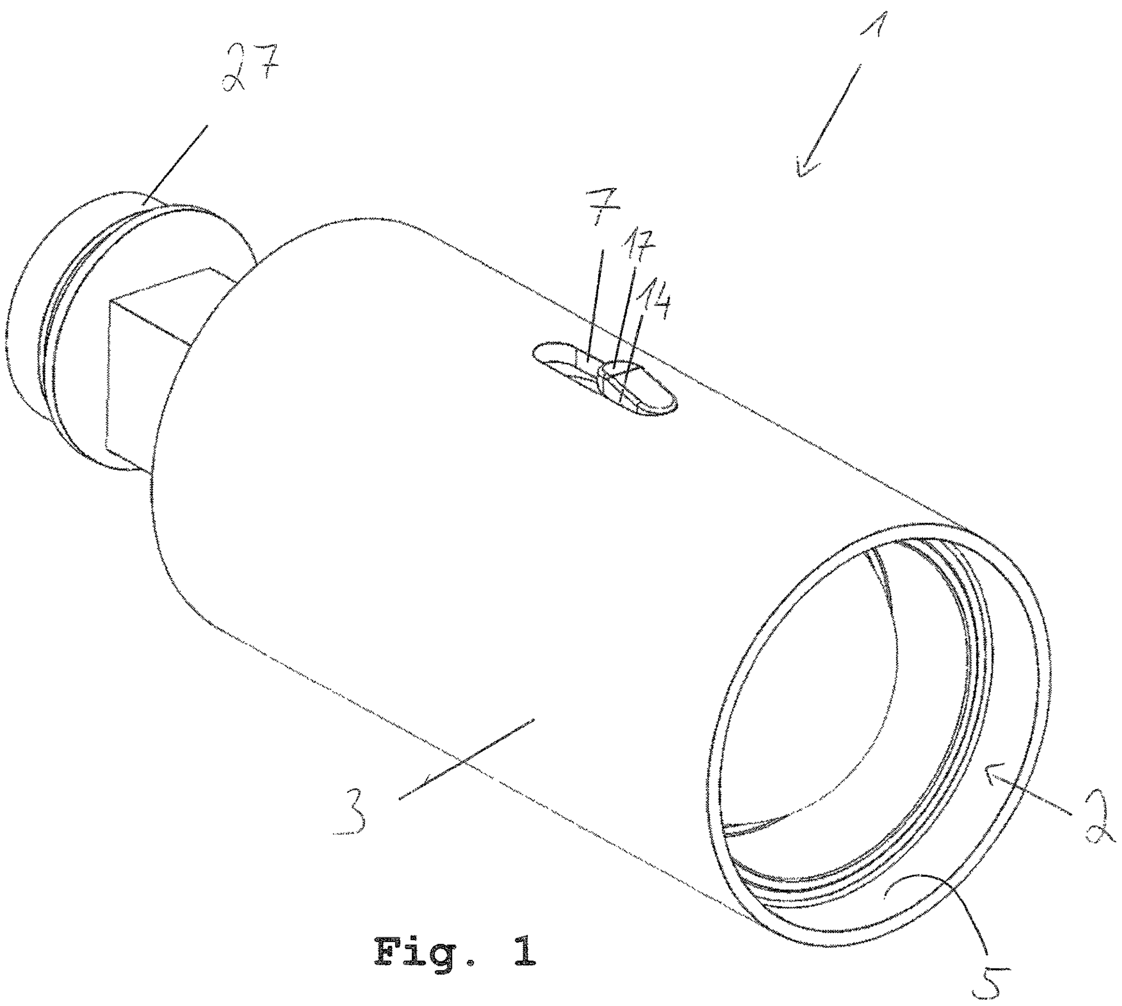
FIG. 1 shows an interior light for shelf or display case illumination in the assembled state.

The accompanying drawings are intended to provide further understanding of the embodiments of the invention. They illustrate embodiments and serve to explain principles and concepts of the invention in connection with the description. Other embodiments and many of the stated advantages may be derived from the drawings. The elements of the drawings are not necessarily to scale.

In the drawings, unless stated otherwise, like, functionally equivalent and equivalently acting elements, features and components are provided with like reference numerals in each case.

FIG. 1 shows an interior light 1 for shelf or display case illumination in the assembled state. The interior light 1 has a main body 3 and an adjustment unit 2. The adjustment unit 2 is fully inserted into a cylindrical recess 5 of the main body 3. The main body 3 has a guide 7, which is formed as a slot-shaped opening in the main body 3 and extends parallel to a cylinder axis 12 of the recess 5. Guide means 14, which are guided within the guide 7, are provided on the adjustment unit 2. The guide means 14 are formed as guide faces extending radially with respect to the recess 5. The guide means 14 extend through the guide 7 together with an actuation portion 17.

In a first dimensioning, the interior light 1 has an opening diameter of for example 22 mm and a length of for example 44 mm. Alternatively, in a second dimensioning, the interior light 1 may have a diameter of 32 mm and a length of 53 mm.

The main body 3 has, at the end thereof opposite the recess 5, a mounting 27, which is formed to be mounted in a busbar. The mounting 27 is coupled to a cooling body (not shown here) of the main body 3. The mounting is circular in the region in which it can be held in a busbar, and so the interior light 1 is rotatable at any angle relative to the busbar. The mounting 27 also has an articulation region (not shown here), by means of which the interior light 1 can be tilted from a busbar into various adjustment angles. The interior light 1 can thus be orientated in a desired direction from a busbar. By means of the adjustment unit 2, the beam angle of the interior light 1 can also be adapted, which is particularly advantageous when being used for shelf or display case illumination in order to adapt the illumination to articles arranged in the shelf or display case.

Figure 2:
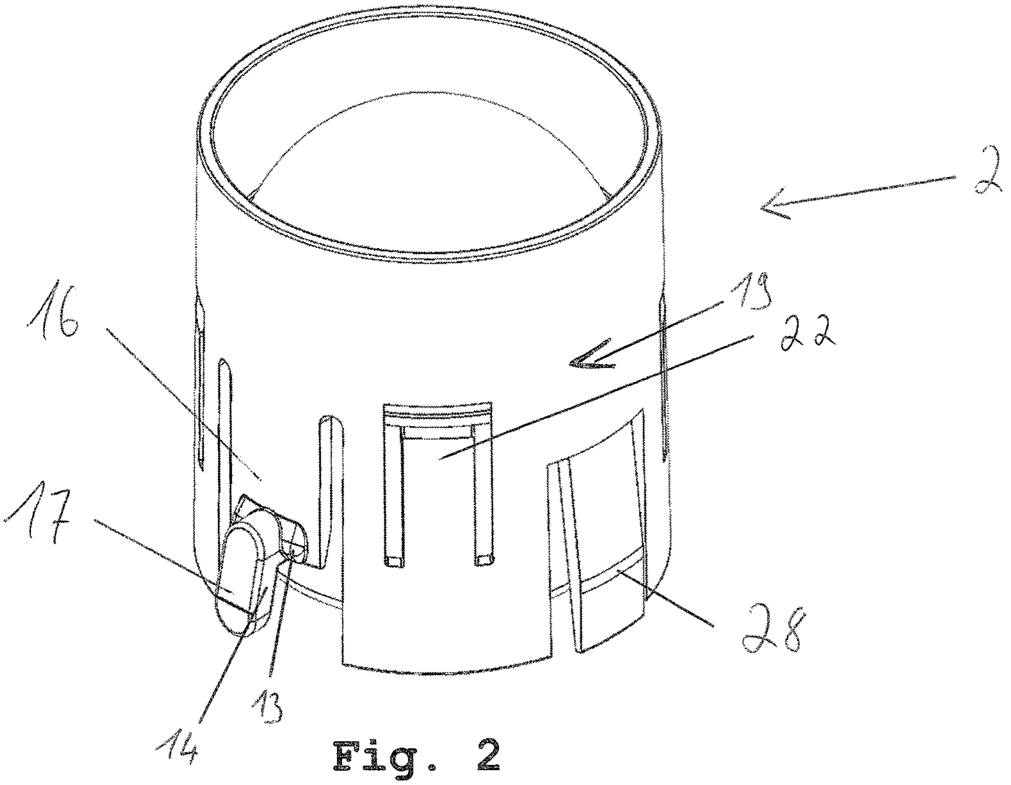
FIG. 2 is a perspective view of an adjustment unit.

FIG. 2 is a perspective view of the adjustment unit 2. This has a latch holder 19 and a latch tab 16 formed integrally therewith. Furthermore, centring lugs 28, also formed integrally with the latch holder 19, are provided for centring the adjustment unit.

The latch mounting 19 of the adjustment unit 2 is formed as a hollow cylinder and has a latch arm 22 which is formed and provided for holding a lens 4 arranged inside the hollow cylinder and a reflector 28 arranged inside the hollow cylinder, as is discussed in greater detail with reference to FIG. 4.

The latch tab 16 is integrally formed on the latch holder 19 or the adjustment unit 2 on a first end, extends along the adjustment unit 2, and protrudes slightly outwards therefrom in the manner of a wing. At the second end thereof, which is connected to the first end via a spring arm, the latch tab 16 has a transversely extending rib, which acts as a mating latch means 13 for latch means 8 provided on the main body 3. Radially orientated, outwardly extending guide faces, which act as guide means 14, and an actuation part 17 are also provided. The actuation part 17 and the guide faces 14 are formed as a single peg, which is formed integrally centrally on the rib and extends radially outwards offset therefrom in a manner which axially extends the spring arm.

The adjustment unit 2 has two latch tabs 16, which are arranged opposite one another.

Figure 3:
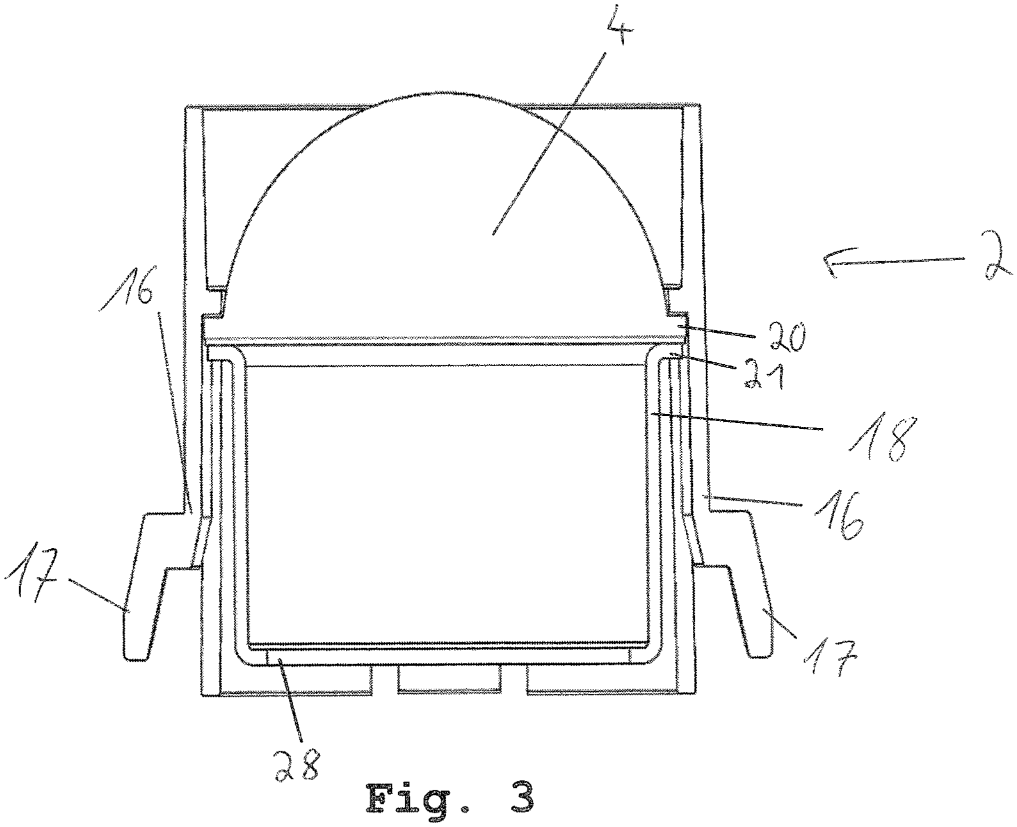
FIG. 3 is a cross-sectional view through the adjustment unit of FIG. 2.

FIG. 3 is a cross-sectional view through the adjustment unit 2 of FIG. 2. The cross section extends through the two latch tabs 16. In this drawing, in particular the shape of the lens 4 and the reflector 18 can be seen.

The lens 4 is provided as a plano-convex lens in this case. It has a shoulder 20 by means of which it is held in the latch holder 19.

The reflector 18 is formed cup-shaped and has a flange 21 by means of which it is also held in the latch holder 19. The reflector 18 also has, in the region of the base of the cup shape, a large recess 28, which promotes the passage of light through the adjustment unit 2. The reflector is a deep-drawn part.

In the region of the latch tab 16, it can be seen in this drawing that the actuation portions 17 are provided radially offset. By means of this radial offset, in the assembled state the actuation portions 17 engage through a guide 7 of the main body 3, and are therefore actuatable from the outside.

Figure 4:
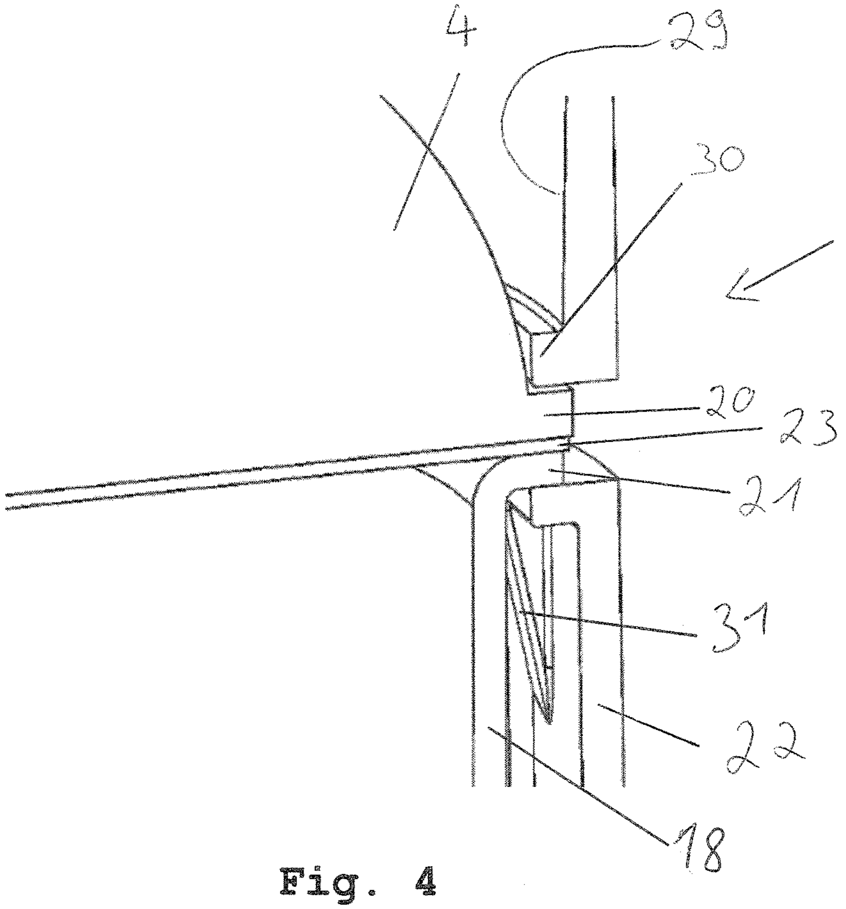
FIG. 4 is a detail of a cross-section through the adjustment unit in the region of a latch holder.

FIG. 4 is a detail of a cross section through the adjustment unit 2 in the region of the latch holder 19. This drawing shows the shoulder 20 of the lens 4 and the flange 21 of the reflector 18 in detail. A homogenisation film 23, for homogenising the light to be emitted, is laid between the lens 4 and the reflector 18.

The latch holder 19 has a latch arm 22 and an internal rib 30 integrally formed on an internal face 29 of the hollow cylindrical shape of the latch holder 19. The lens 4, the reflector 18 and the homogenisation film 23 are held positively between the internal rib 30 and the latch arm 21. For this purpose, during assembly, the lens 4, the reflector 18 and the homogenisation film 23 are inserted together into the cavity, formed by the hollow cylindrical shape, of the latch holder 19 from the side of the latch arm. A ramp 31, which slides on the shoulder 20 of the lens 4 or on the flange 21 of the reflector 18, is provided on the latch arm 22, and so the spring arm 22 is tensioned. If the end of the spring arm 22 or of the ramp 31 is passed, the latch arm 22 latches behind the flange 21 of the reflector 18. Simultaneously, in this context the shoulder 20 of the lens 4 is placed against the internal rib 30, and so the lens 4 and the reflector 18 as well as the homogenisation film 23 positioned therebetween are held positively in the latch holder 19.

Figure 5:
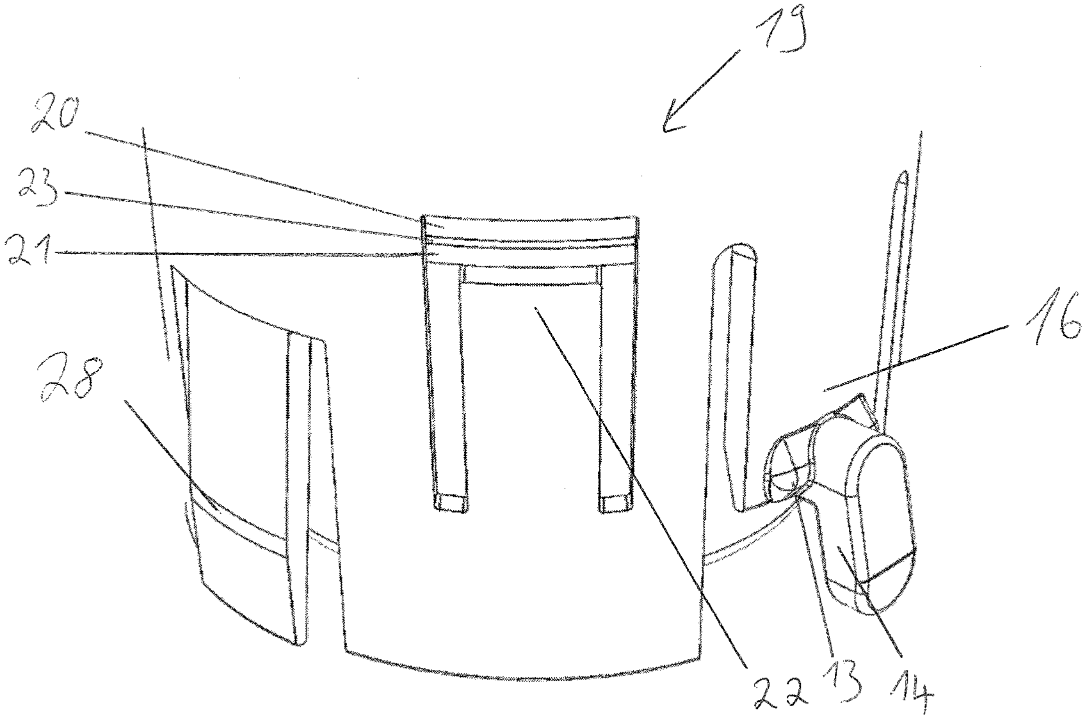
FIG. 5 is a detail of a plan view of the adjustment unit in the region of a latch holder and a latch tab.

FIG. 5 is a detail of a plan view of the adjustment unit 2 in the region of a latch holder 19 and a latch tab 16. In particular, the outline of the latch tab 16 can be seen in detail here.

The rib acting as a mating latch means 13 is rounded, and so coordinated latching is possible at the latch means 8 of the main body. It can also be seen that the guide faces provided as guide means 14 extend radially outwards and longitudinally or axially with respect to the hollow cylindrical shape of the latch holder, and so a guide face is created which is planar in a manner corresponding to the slot-like guides 7 of the main body 3. The width of the peg on which the guide faces are formed corresponds with slight play to the width of the guides 7.

In the plan view shown, the end faces of the shoulder 20 of the lens 4, the homogenisation film 23 and the flange 21 of the reflector 18 can also be seen from the outside in the region of the latch arm 22.

The shape of the centring lug 28 can also be seen. Two centring lugs 28 of this type are provided on the adjustment unit 2 and are arranged opposite one another. The centring lugs 28 extend substantially axially, and protrude slightly radially. They are integrally formed on the latch holder 19 or the adjustment unit 2 at a first end, and are formed flattened at the second end thereof. In the flattened regions, the centring lugs 28 slide on an inner face 15 of the recess 5 when the adjustment unit 2 is assembled in or inserted into the recess 5 of the main body 3, and thus ensure that the adjustment unit 2 remains centred during insertion into the recess 5. This also applies to the adjustment of the adjustment unit 2 between different latching stages 9, 10, 11 of the main body 3.

Figure 6:
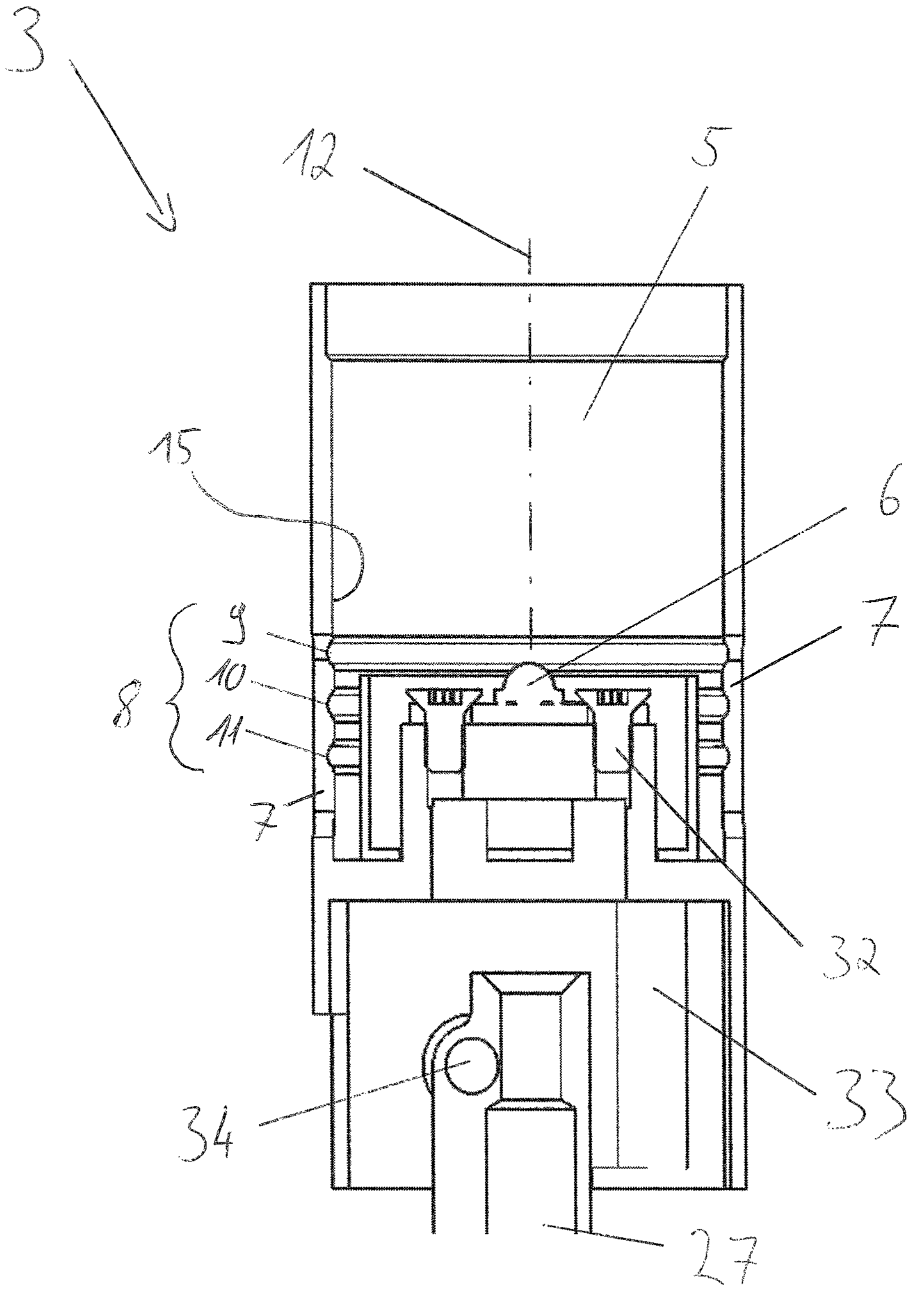
FIG. 6 is a cross-sectional view through a main body.

FIG. 6 is a cross-sectional view through the main body 3. The main body 3 has a cylindrical recess 5 and a lighting means 6 arranged inside the recess 5. The lighting means 6 is an LED, together with an associated circuit board, which is attached in the recess by means of screws 32.

At the end opposite the recess, the main body 3 has a cooling body 33. The cooling body is coupled to the mounting 27 (not fully shown here) via the articulation region 34. By means of the mounting 27 and the cooling body 33, the main body 3 is held, for example on a busbar. Furthermore, the cooling body 33 provides a sufficient surface area for heat transfer for reliable operation of the lighting means 6.

Moreover, conductors (not shown) for the power supply to the lighting means 6 are provided in the mounting 27 and on the cooling body 33.

The cylindrical shape of the recess 5 is provided as a circular cylindrical shape having a cylinder axis 12. Latch means 8 in the form of a plurality of latching stages 9, 10, 11 are provided on an inner face 15 of the recess 5 and are in the form of latch grooves. Guides 7, each forming an opening, are also provided on the recess 5, and are formed as slots and extend parallel to the cylinder axis 12, in other words axially. The latch grooves extend perpendicularly thereto, in other words in the peripheral direction or tangentially.

Figure 7:
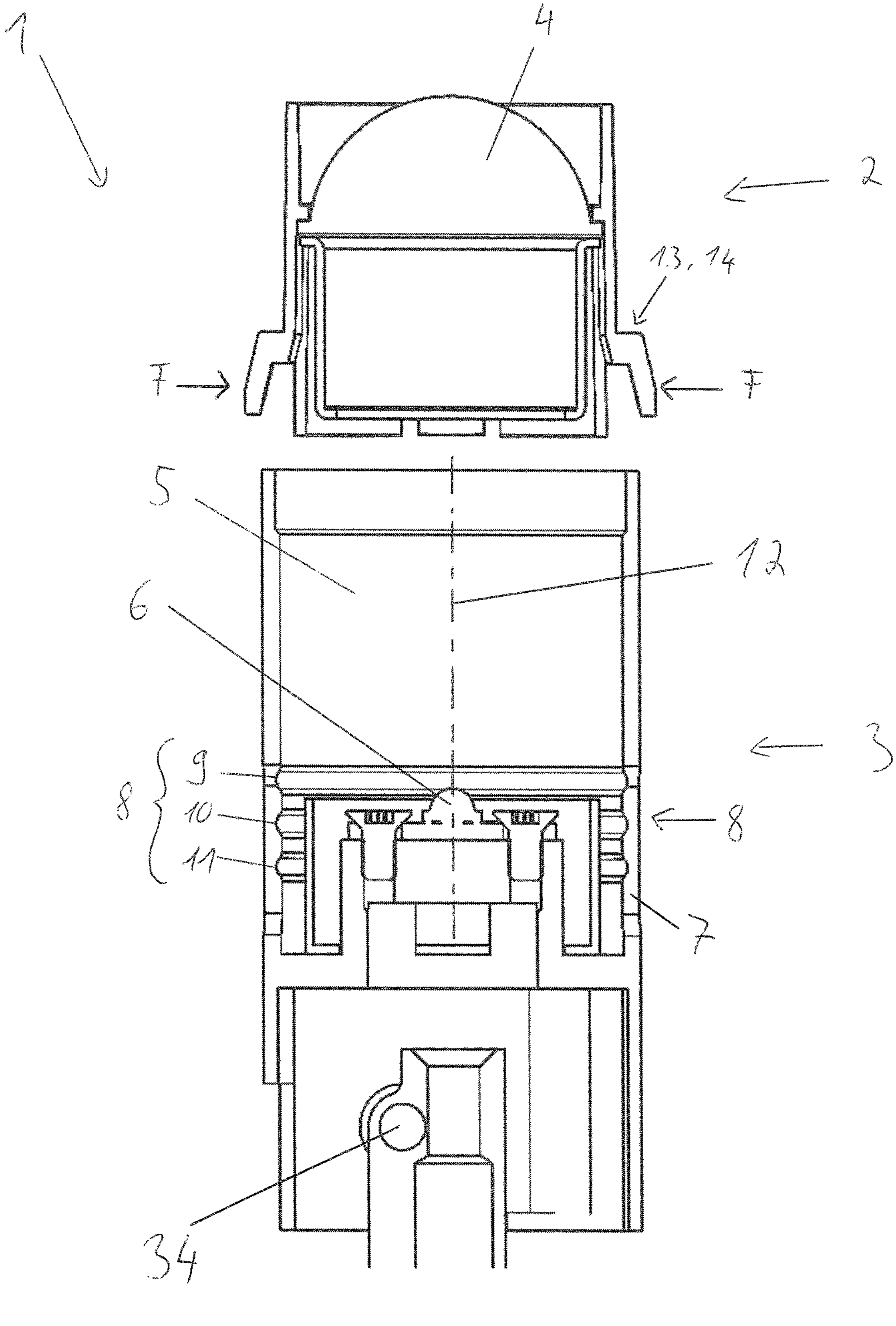
FIG. 7 is as cross-sectional view through the main body and the adjustment unit during the insertion of the adjustment unit.

FIG. 7 is a cross-sectional view through the main body 3 and the adjustment unit 2 during the insertion of the adjustment unit 2. The entire adjustment unit 2 is inserted into the recess 5 axially, in other words towards the cylinder axis. For this purpose, the latch tabs 16 are pushed inwards until they fit into the recess 5, as indicated by the arrows labelled F. During the further axial displacement of the adjustment unit 2 into the recess 5, the guide means 14 reach the guides 7. As a result of the resilient biasing of the pressed-in latch tabs 16, the guide means 14 latch into the guides 7. In the position in which the guide means latch into the guides 7, a first latching step 9 of the latch means 8 is simultaneously provided in the form of a peripheral latch groove, the mating latch means 13 latching to the first latching stage 9 in this position. From this position, the different latching stages can subsequently be taken on by releasing the mating latch means.

Figure 8C:
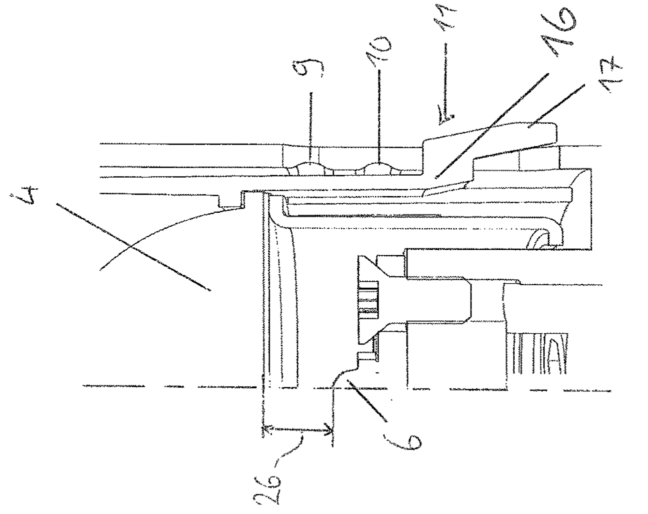
FIG. 8A-8C are details of a cross-sectional view of the main body and the adjustment unit in latched states at different latching stages.
Figure 8B:
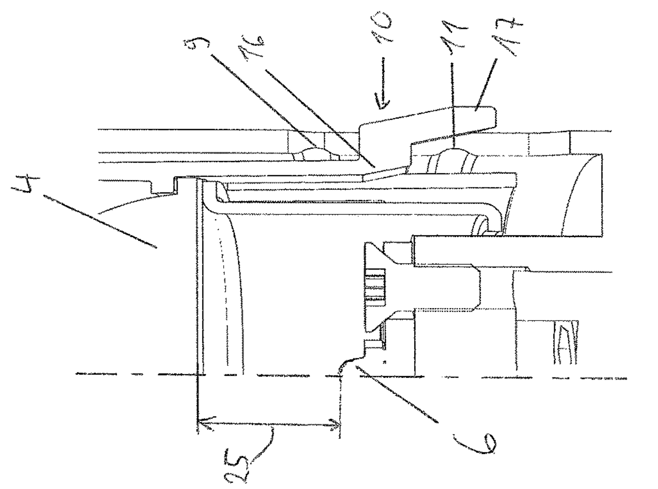
Figure 8A:
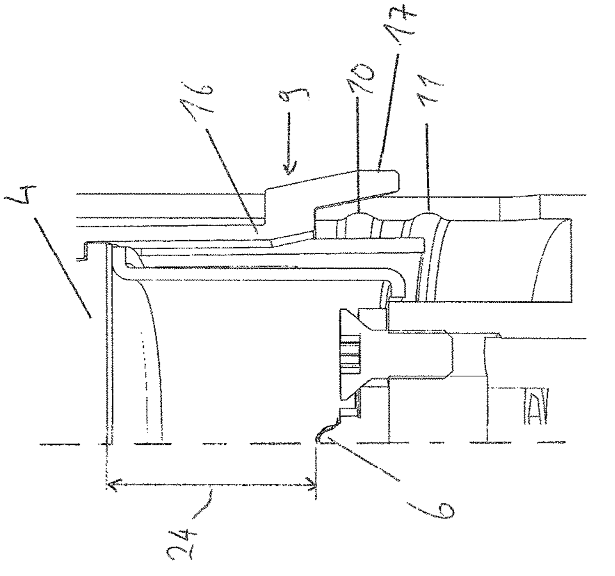

FIG. 8A to 8C are details of the cross-sectional view of the main body 3 and the adjustment unit 2 in the latched state at different latching stages 9, 10, 11.

FIG. 8A shows the above-described state in which the mating latching means 13 (not shown because the section plane is through the latch tab 16) are latched to the first latching stage 9. In this context, a first distance 24, which is the largest settable distance, is set between the lens 4 and the lighting means 6. At this largest settable distance, the interior light 1 has a minimum beam angle of for example 15°.

FIG. 8B shows the adjustment unit 2 and the main body 3 in a position in which the mating latch means 13 are latched to the second latching stage 10. To reach this position, the latch tabs are actuated at the actuation portions 17, which happens by pressing manually from the outside, and so the mating latch means 13 are released from the latch means 8. Subsequently, the adjustment unit 2 is displaced axially towards the cylinder axis 12 of the recess 5 until the mating latch means 13 latch to the second latching stage 10. In this context, a second distance 25, which is a medium settable distance 25, is set between the lens 4 and the lighting means 6. The medium distance 25 is smaller than the first, largest settable distance 24, for example by 2.5 mm. At this medium distance 25, the interior light 1 has a medium beam angle of for example 20°.

FIG. 8C shows the adjustment unit 2 and the main body 3 in a position in which the mating latch means 13 are latched to the third latching stage 11. In this context, the adjustment takes place analogously to the adjustment for reaching the second latching stage 10. In this way, a third distance 26, which is a minimum settable distance 26, is set between the lens 4 and the lighting means 6. At this minimum distance 26, the interior light 1 has a maximum beam angle of for example 25°.

Although the present invention has been fully described in the above by way of preferred embodiments, it is not limited thereto, but can be modified in various ways.

So, for example, the adjustable range of the beam angle may be made much wider, for example between 10° and 50° or 10° and 30°. Accordingly, there are greater differences between the different distances, and/or more than three different latching stages are provided, and/or the lens 4 has an appropriately adapted focal length.

Aside from LEDs, all other types of lighting means may be used as the lighting means, for example also halogen lighting means, OLEDs or the like.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 10 2015 214 949.8, filed Aug. 5, 2016.

The examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An interior light, comprising:
- an adjustment unit having a lens, wherein a homogenization film configured to homogenize emitted light is integrated into the adjustment unit;
- a main body having a cylindrical recess and a lighting means arranged inside the cylindrical recess;
- at least one guide device arranged on the cylindrical recess and extending parallel to a cylinder axis of the cylindrical recess; and
- latch means arranged in the region of the cylindrical recess and having a plurality of latching stages, the adjustment unit including mating latch means latachable to the latch means and guide means configured to guide the adjustment unit in the guide device, the guide means being arranged at different positions within the guide when the mating latch means latch to the different latching stages, with a different distance being set between the lighting means and the lens.

2. The interior light of claim 1 wherein the at least one guide is formed as an elongate opening in the main body.

3. The interior light of claim 1 wherein the latch means are arranged directly on the guide device.

4. The interior light of claim 3 wherein the latch means are formed as grooves laterally connecting to an opening in an inner wall of the cylindrical recess.

5. The interior light of claim 1 having at least two guide devices arranged opposite to one another on the recess, and/or at least two latch tabs arranged opposite to one another on the adjustment unit, the mating latch means being formed as latch portions provided on the latch tabs.

6. The interior light of claim 5 wherein the guide means are formed as guide portions provided on the latch tabs.

7. The interior light of claim 5 wherein the latch tabs comprise an actuation portion configured to manually release the latch portion from the latch means, the latch tabs being actuatable by resilient bending by means of manual pressure on the actuation portion.

8. The interior light of claim 5 wherein the latch portion is formed as at least one rib connecting to the actuation portion, the rib being arranged offset laterally and inwards towards the cylinder axis with respect to the actuation portion.

9. The interior light of claim 1 wherein the adjustment unit and the latching stages are shaped to adjust the beam angle of the interior light within a predetermined range by changing the distance between the lighting means and the lens.

10. The interior light of claim 9 wherein the predetermined range is from 10° to 50°.

11. The interior light of claim 10 wherein the predetermined range is from 10° to 30°.

12. The interior light of claim 11 wherein the predetermined range is from 15° to 25°.

13. The interior light of claim 1 wherein the adjustment unit has a reflector and a latch holder configured to hold and latches both the lens and the reflector.

14. The interior light of claim 13 wherein the reflector and/or the lens have a shoulder or a flange, and the latch holder has a spring arm, the spring arm being tensioned when the lens and the reflector are inserted into the latch holder and latching in behind the shoulder and/or the flange.

15. The interior light of claim 13 wherein latch tabs are formed integrally with the latch holder as an injection-moulded part.

16. The interior light of claim 1 wherein the homogenization film is latchable between the lens and the reflector into the latch holder.

17. A method for manufacturing an interior light, comprising:

providing a main body having a cylindrical recess and a lighting means arranged inside the cylindrical recess;

extending at least one guide device parallel to a cylinder axis of the cylindrical recess on the cylindrical recess;

providing latch means having a plurality of latching stages in the region of the cylindrical recess;

providing an adjustment unit having a lens, mating latch means latchable to the latch means, and guide means configured to guide the adjustment unit in the guide device, wherein the adjustment unit includes a homogenization film configured to homogenize the emitted light and integrated into the adjustment unit; and inserting the adjustment unit into the cylindrical recess, the guide means being arranged at different positions within the guide device when the mating latch means latch to the different latching stages, a different distance being set between the lighting means and the lens.

18. The method of claim 17 wherein providing the adjustment unit includes pre-assembling the lens, a reflector and a latch holder formed integrally with the guide means and/or latch means.

* * * * *